United States Patent
Hackett

(10) Patent No.: US 12,535,015 B2
(45) Date of Patent: Jan. 27, 2026

(54) ACTIVELY DRIVEN REMOTE MOUNT OPTICAL PROBE

(71) Applicant: RTX Corporation, Farmington, CT (US)

(72) Inventor: Bryan James Hackett, Berlin, CT (US)

(73) Assignee: RTX CORPORATION, Farmington, CT (US)

( * ) Notice: Subject to any disclaimer, the term of this patent is extended or adjusted under 35 U.S.C. 154(b) by 30 days.

(21) Appl. No.: 18/499,937

(22) Filed: Nov. 1, 2023

(65) Prior Publication Data

US 2025/0137385 A1  May 1, 2025

(51) Int. Cl.
 *F01D 17/02* (2006.01)
 *F01D 21/00* (2006.01)
 *F02C 7/00* (2006.01)

(52) U.S. Cl.
 CPC .......... *F01D 17/02* (2013.01); *F01D 21/003* (2013.01); *F02C 7/00* (2013.01); *F05D 2220/32* (2013.01); *F05D 2260/80* (2013.01)

(58) Field of Classification Search
 CPC ... F01D 21/003; F01D 17/02; F05D 2270/804
 See application file for complete search history.

(56) References Cited

U.S. PATENT DOCUMENTS

| 4,836,689 | A * | 6/1989 | O'Brien | G01J 5/0806 359/509 |
| 6,364,524 | B1 | 4/2002 | Markham | |
| 6,992,315 | B2 | 1/2006 | Twerdochlib | |
| 7,484,413 | B2 | 2/2009 | Georgeson et al. | |
| 8,544,279 | B2 * | 10/2013 | Sappey | F01D 21/003 431/75 |
| 9,400,217 | B2 * | 7/2016 | Baleine | G01J 5/0818 |
| 10,041,371 | B1 | 8/2018 | Deascanis et al. | |
| 10,473,528 | B2 | 11/2019 | Sakami et al. | |
| 10,697,317 | B2 * | 6/2020 | Bailey | F01D 25/24 |

(Continued)

FOREIGN PATENT DOCUMENTS

| CA | 2959669 A1 | 9/2017 | |
| DE | 102016116359 A1 * | 3/2017 | ........... F01D 21/003 |
| WO | WO-2010028729 A1 * | 3/2010 | ............. F01D 25/00 |

OTHER PUBLICATIONS

Search Report issued in European Patent Application No. 24209289. 8; Date of Mailing Mar. 19, 2025 (7 pages).

*Primary Examiner* — Topaz L. Elliott
(74) *Attorney, Agent, or Firm* — CANTOR COLBURN LLP

(57) ABSTRACT

A gas turbine engine includes a fan duct, an engine casing, and a gaspath casing. A thermal imaging device is integrated with the gas turbine engine. The thermal imaging device includes: a main body comprising processing circuitry, where the main body is mountable to the fan duct or a mounting structure separate from the fan duct. The thermal imaging device includes a probe mounted to the engine casing. The probe includes one or more sensors configured to detect thermal energy, and the probe is configured to transmit an optical signal based on the detected thermal energy, to an aperture of the main body, over an air gap between the probe and the main body. The processing circuitry is configured to provide temperature information in response to processing the optical signal.

16 Claims, 12 Drawing Sheets

(56) References Cited

U.S. PATENT DOCUMENTS

| | | | |
|---|---|---|---|
| 11,773,788 B2* | 10/2023 | Gonidec | F02K 1/76 |
| | | | 398/141 |
| 2008/0289342 A1* | 11/2008 | Sappey | G01M 15/14 |
| | | | 60/734 |
| 2012/0101769 A1* | 4/2012 | Zombo | G01J 5/0022 |
| | | | 702/135 |
| 2015/0330866 A1* | 11/2015 | Yang | G06T 7/75 |
| | | | 73/112.02 |
| 2015/0346032 A1* | 12/2015 | Baleine | G01J 5/10 |
| | | | 250/342 |
| 2017/0234772 A1 | 8/2017 | Nirmalan et al. | |
| 2017/0268376 A1* | 9/2017 | Bailey | G02B 23/2476 |
| 2018/0003060 A1* | 1/2018 | Lipkin | B23P 6/002 |
| 2019/0383158 A1* | 12/2019 | Diwinsky | H04N 23/555 |
| 2021/0285382 A1* | 9/2021 | Gonidec | B64D 31/02 |
| 2021/0301676 A1* | 9/2021 | Ahmadian | G01N 25/20 |

* cited by examiner

ACTIVELY DRIVEN REMOTE MOUNT OPTICAL PROBE

TECHNICAL FIELD

This disclosure relates to an optical probe, and more particularly to thermal data acquisition using the optical probe.

BACKGROUND

Engines, such as gas turbine engines, industrial gas turbine engines, and/or the like, can be used to provide thrust to aircraft, other types of vehicles, and electrical generators. During operation of such engines, heat may be produced at some components within the engines.

Some analysis techniques for gas turbine engine design and, in some cases, turbine airfoil design, utilize thermal imaging. For example, high resolution, full field thermal images allow for effective rotor blade cooling hole mapping, validation of thermal models, and anomaly detection compared to other techniques (e.g., techniques using pyrometers).

However, approaches which utilize a long-wave infrared (LWIR) camera for thermal imaging of a gas turbine engine (e.g., for thermal imaging of turbine airfoils), the LWIR camera does not lend itself to gas turbine integration given the available volume within the gas turbine engine. For example, the LWIR camera can be relatively large compared to the available volume within the gas turbine engine.

In some cases, depending on proximity of the LWIR camera to the gaspath of the gas turbine engine, some other approaches may attempt to allocate a relatively large amount of additional space within the gas turbine engine (e.g., an area between the gaspath casing and fan ducts) for cooling the LWIR camera. However, in some cases, the area between the gaspath casing and fan ducts is generally occupied by external tubing/cabling which drives the LWIR camera, and the LWIR camera is fan duct mounted. The mounting of the LWIR camera to the fan duct creates another problem, as the gaspath casing and the fan ducts can move independent of each other, and some other approaches incorporate some flexibility in the mounting scheme.

Techniques for providing analysis of gas turbine engine design and, in some cases, turbine airfoil design are desired.

BRIEF DESCRIPTION

Disclosed is a gas turbine engine including: a fan duct; an engine casing; and a gaspath casing, wherein a thermal imaging device is integrated with the gas turbine engine, the thermal imaging device including: a main body including processing circuitry, wherein the main body is mountable to the fan duct or a mounting structure separate from the fan duct; and a probe mounted to the engine casing, wherein: the probe includes one or more sensors configured to detect thermal energy; and the probe is configured to transmit an optical signal based on the detected thermal energy, to an aperture of the main body, over an air gap between the probe and the main body, wherein the processing circuitry is configured to provide temperature information in response to processing the optical signal.

In addition to one or more of the features described herein, or as an alternative to any of the embodiments, the thermal imaging device further includes control circuitry configured to generate one or more control signals associated with maintaining the air gap between an end portion of the probe and the main body.

In addition to one or more of the features described herein, or as an alternative to any of the embodiments, the gas turbine engine further includes a target distance of the air gap is in a range of about 6 inches to about 12 inches.

In addition to one or more of the features described herein, or as an alternative to any of the embodiments, the thermal imaging device further includes control circuitry configured to generate one or more control signals associated with maintaining an alignment between the probe and the main body.

In addition to one or more of the features described herein, or as an alternative to any of the embodiments, the thermal imaging device further includes feedback instrumentation, wherein the feedback instrumentation includes: an emitter integrated with the main body and configured to emit light of an infrared (IR) band; a set of photodetectors located at an end portion of the probe and configured to generate an electrical signal in response to detecting the emitted light; and control circuitry configured to generate, based on the electrical signal, one or more control signals associated with positioning the main body.

In addition to one or more of the features described herein, or as an alternative to any of the embodiments, the IR band is a long-wave IR band.

In addition to one or more of the features described herein, or as an alternative to any of the embodiments, the probe at least partially protrudes through and is mounted to the gaspath casing; and the one or more sensors face in a direction toward a rotor blade of the gas turbine engine.

In addition to one or more of the features described herein, or as an alternative to any of the embodiments, the main body is located outside of the gas turbine engine.

In addition to one or more of the features described herein, or as an alternative to any of the embodiments, the thermal imaging device further includes a shielding structure coupled to the main body, the fan duct, or both.

In addition to one or more of the features described herein, or as an alternative to any of the embodiments, the thermal imaging device further includes a motor configured to position the main body based on one or more control signals generated by control circuitry of the thermal imaging device.

In addition to one or more of the features described herein, or as an alternative to any of the embodiments, the gas turbine engine further includes a low pressure compressor, a low pressure turbine, a high pressure compressor, and a high pressure turbine; and the thermal energy is associated with at least one of the low pressure compressor, the low pressure turbine, the high pressure compressor, and the high pressure turbine.

In addition to one or more of the features described herein, or as an alternative to any of the embodiments, the gas turbine engine is a prototype gas turbine engine.

Described is a method of controlling a thermal imaging device for a gas turbine engine, including: detecting, by a probe of the thermal imaging device, thermal energy associated with the gas turbine engine; transmitting, by the probe, an optical signal based on detected thermal energy associated with the gas turbine engine, wherein the optical signal is transmitted to an aperture of a main body of the thermal imaging device, over an air gap between the probe and the main body; and providing temperature information associated with the gas turbine engine in response to processing the optical signal.

In some aspects, the techniques described herein relate to a method, further including: generating, by control circuitry, one or more control signals associated with maintaining the air gap between an end portion of the probe and the main body.

In some aspects, the techniques described herein relate to a method, wherein a target distance of the air gap is in a range of about 6 inches to about 12 inches.

In some aspects, the techniques described herein relate to a method, further including: generating, by control circuitry, one or more control signals associated with maintaining an alignment between the probe and the main body.

In some aspects, the techniques described herein relate to a method, further including: emitting, by an emitter integrated with the main body, light of an infrared (IR) band; generating, by a set of photodetectors located at an end portion of the probe, an electrical signal in response to detecting the emitted light; and generating, by control circuitry, one or more control signals associated with positioning the main body based on the electrical signal.

In some aspects, the techniques described herein relate to a method, wherein the IR band is a long-wave IR band.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
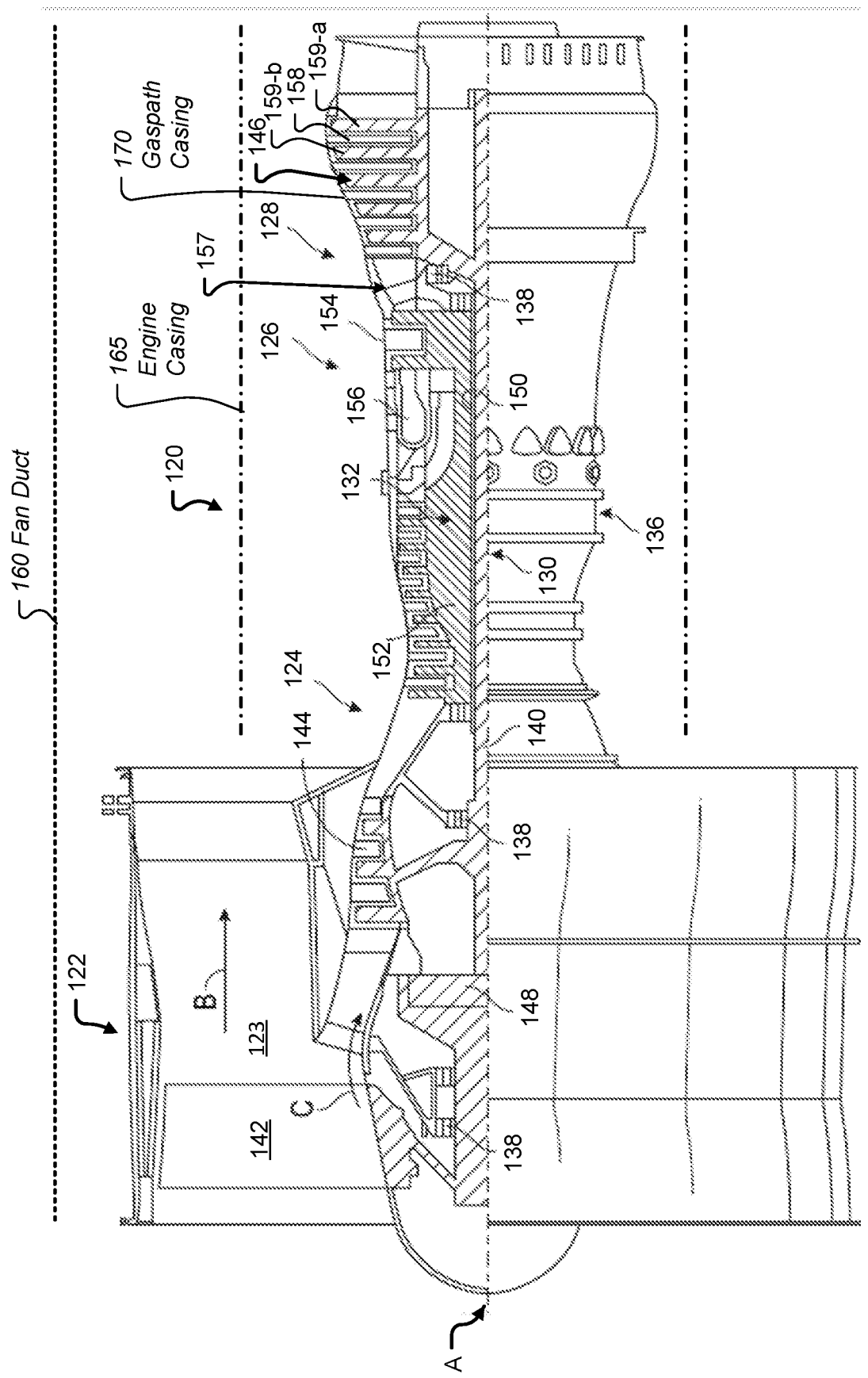
FIG. 1 is a schematic, partial cross-sectional view of a gas turbine engine in accordance with the present disclosure.

A detailed description of one or more embodiments of the disclosed apparatus and method are presented herein by way of exemplification and not limitation with reference to the figures. According to one or more embodiments of the present disclosure, an actively driven remote mount LWIR Camera and techniques for mounting the LWIR camera are described which overcome the shortcomings of other approaches. Aspects of the LWIR camera described herein circumvent a reliance on a flexible mounting scheme by separating the gaspath casing mount (associated with the probe of the LWIR camera) and the fan duct mount (associated with the body of the LWIR camera).

In accordance with one or more embodiments of the present disclosure, an LWIR camera is described in which the engine casing mount is disassociated or mechanically separate from the fan duct mount. In some aspects, the LWIR camera supports the transmission of an optical signal from the probe to the LWIR camera, over an air gap between the camera mount and the probe mount. In an example implementation, in view of the projection of the optical signal over the air gap, the LWIR camera includes shielding which overlaps the air gap and prevents the ingress of stray energy into the LWIR camera. In one or more embodiments, to mitigate misalignment concerns during operation of the LWIR camera, the LWIR camera is mounted on linear actuators (e.g., linear traverse rails) supportive of driving the LWIR camera along with the probe as the LWIR camera and the probe move independently.

According to one or more embodiments of the present disclosure, the techniques described herein may incorporate a feedback loop associated with maintaining the alignment between the LWIR camera and the probe. In an example, photodetectors or infrared detectors are arrayed about the camera objective such that, based on a determined misalignment associated with the photodetectors or infrared detectors (e.g., should the alignment stray), a correction can be applied to the actuator schedule.

In an example implementation, a control program may control the alignment of the LWIR camera and the probe according to an operation schedule of actuators of the gas turbine engine, in which the operation schedule is based on expected differential thermal excursion of the engine hardware. In some aspects, the control program may support an override to allow the photodetectors to correct should a misalignment occur. That is, for example, the control program may support correcting the alignment between the LWIR camera and the probe based on a misalignment detected using the photodetectors.

Aspects of the present disclosure support additional and/or alternative techniques for positional correction and alignment of the LWIR camera and/or the probe. In an example, the control program may support implementing positional correction and alignment based on the image (e.g., image data) collected by the LWIR camera. Other non-limiting examples of feedback based on which the control program may implement positional correction and alignment include proximity measurements, strain measurements, and temperature measurements provided by corresponding hardware components. The techniques described herein include positional correction with respect to one or more axes (e.g., all three axes) using positional correction/alignment and feedback information as described herein.

Particular aspects of the subject matter described herein may be implemented to realize an LWIR camera in which the separation of the engine casing mount from fan duct mounting mitigates differential thermal growth concerns. The example modularity features described herein support flexibility in positioning and improved repairability of the LWIR camera. In some aspects, the modularity features support mounting of the LWIR camera body at the outside of the gas turbine engine, which disassociates camera cooling requirements from the probe. Accordingly, for example, the modularity features support integration with the gas turbine engine for thermal imaging of the gas turbine engine, without relatively complex or heavy modifications to the structure of the gas turbine engine.

The example modularity features and alignment features described herein support the realization of an LWIR camera capable of gathering thermal data associated with validating an airfoil design (e.g., airfoil thermal data on development engines), in which the time/cost integrating the LWIR camera with the development engines is reduced compared to other approaches. The techniques and LWIR camera described herein may be implemented in association with validating any suitable rotating hardware design (e.g., gas turbine engine, aircraft engines, and the like).

FIG. 1 schematically illustrates a gas turbine engine 120. The gas turbine engine 120 is disclosed herein as a two-spool turbofan that generally incorporates a fan section 122, a compressor section 124, a combustor section 126 and a turbine section 128. Alternative engines might include other systems or features. The fan section 122 drives air along a bypass flow path B in a bypass duct 123, while the compressor section 124 drives air along a core flow path C for compression and communication into the combustor section 126 then expansion through the turbine section 128. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

With reference to FIG. 1, as used herein, "aft" refers to the direction associated with the tail (e.g., the back end) of an aircraft, or generally, to the direction of exhaust of the gas turbine engine (to the right in FIG. 1). The term "forward" refers to the direction associated with the nose (e.g., the front end) of an aircraft, or generally, to the direction of flight or motion (to the left in FIG. 1).

The gas turbine engine 120 generally includes a low speed spool 130 and a high speed spool 132 mounted for rotation about an engine central longitudinal axis A relative to an engine static structure 136 via several bearing systems 138. It should be understood that various bearing systems 138 at various locations may alternatively or additionally be provided, and the location of bearing systems 138 may be varied as appropriate to the application.

The low speed spool 130 generally includes an inner shaft 140 that interconnects a fan 142, a first or low pressure compressor 144 and a first or low pressure turbine 146. The inner shaft 140 is connected to the fan 142 through a speed change mechanism, which in gas turbine engine 120 is illustrated as a geared architecture 148 to drive the fan 142 at a lower speed than the low speed spool 130. The high speed spool 132 includes an outer shaft 150 that interconnects a second or high pressure compressor 152 and a second or high pressure turbine 154. A combustor 156 is arranged in gas turbine engine 120 between the high pressure compressor 152 and the high pressure turbine 154. A mid-turbine frame 157 of the engine static structure 136 is arranged generally between the high pressure turbine 154 and the low pressure turbine 146. The mid-turbine frame 157 further supports bearing systems 138 in the turbine section 128. The inner shaft 140 and the outer shaft 150 are concentric and rotate via bearing systems 138 about the engine central longitudinal axis A which is collinear with their longitudinal axes.

The core airflow is compressed by the low pressure compressor 144 then the high pressure compressor 152, mixed and burned with fuel in the combustor 156, then expanded over the high pressure turbine 154 and low pressure turbine 146. The mid-turbine frame 157 includes airfoils which are in the core airflow path C. The turbines 146, 154 rotationally drive the respective low speed spool 130 and high speed spool 132 in response to the expansion. It will be appreciated that each of the positions of the fan section 122, compressor section 124, combustor section 126, turbine section 128, and fan drive gear system 148 may be varied. For example, gear system 148 may be located aft of combustor section 126 or even aft of turbine section 128, and fan section 122 may be positioned forward or aft of the location of gear system 148.

The gas turbine engine 120 in one example is a high-bypass geared aircraft engine. In one non-limiting embodiment, the geared architecture 148 is an epicyclic gear train, such as a planetary gear system or other gear system, with a gear reduction ratio. In one non-limiting embodiment, the fan diameter is significantly larger than that of the low pressure compressor 144. The geared architecture 148 may be an epicycle gear train, such as a planetary gear system or other gear system. It should be understood, however, that the above parameters are only examples embodiments of a geared architecture engine and that the present disclosure is applicable to other gas turbine engines including direct drive turbofans. A significant amount of thrust is provided by the bypass flow path B due to the high bypass ratio.

The gas turbine engine 120 includes a fan duct 160, an engine casing 165, and a gaspath casing 170. Features of the gas turbine engine 120 (e.g., the fan duct 160, engine casing 165, and gaspath casing 170) are not necessarily drawn to scale, and shapes and positions thereof are not limited to the examples illustrated herein. In some aspects, the gas turbine engine 120 may be integrated with the fan 122 in a fan case assembly.

Example aspects of an LWIR camera 200 which may be integrated with the gas turbine engine 120 in association with providing thermal imaging data (e.g., of a rotor blade located upstream or downstream of a probe 220 of the LWIR camera 200) are described herein with reference to the following figures. In the examples described herein, the LWIR camera 200 may provide thermal imaging data of a rotor blade 159 (e.g., rotor blade 159-*a*, rotor blade 159-*b*) associated with the low pressure turbine 146. The LWIR camera 200 may also be referred to herein as a LWIR camera system, a thermal imaging device, a thermal imaging camera system, a thermal imaging system, or the like.

Figure 2:
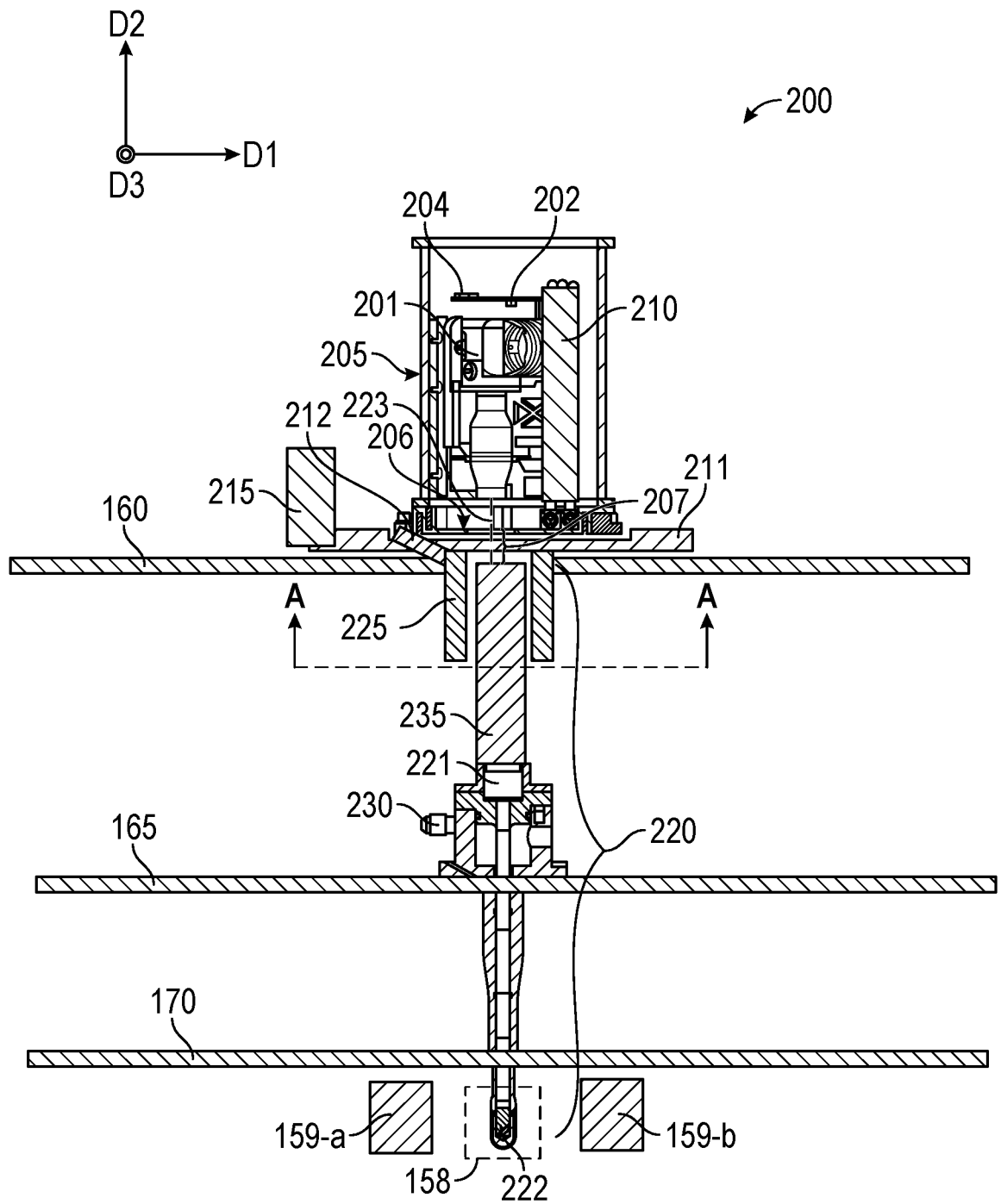
FIG. 2 is a schematic illustrating a configuration integrating a LWIR camera with a gas turbine engine in accordance with one or more embodiments of the present disclosure.

FIG. 2 is a schematic illustrating a configuration integrating a LWIR camera 200 with a gas turbine engine 120 in accordance with one or more embodiments of the present disclosure. In the example of FIG. 2, the gas turbine engine 120 includes the fan duct 160, the engine casing 165, and the gaspath casing 170 of FIG. 1.

The LWIR camera 200 may include a main body 205 (also referred to herein as a housing). In the example of FIG. 2, the main body 205 is located outside of the gas turbine engine 120. According to one or more embodiments of the present disclosure, as the main body 205 is located outside the gas turbine engine 120, the LWIR camera 200 may be integrated with the gas turbine engine 120 without camera cooling (or with substantially less camera cooling compared to some other techniques).

The main body 205 is mountable to surfaces of the gas turbine engine 120. For example, the main body 205 is mountable to the fan duct 160 (e.g., to an outer surface of the fan duct 160), as illustrated in the configuration of FIG. 2. Additionally, or alternatively, the main body 205 is mountable to a mounting structure separate from the fan duct 160, example aspects of which are later described with reference to FIG. 3.

In an example, the main body 205 may include or house a camera module 201 and processing circuitry 202 supportive of generating thermal images associated with the gas turbine engine 120. The main body 205 may include or control circuitry 204 supportive of movement control of the main body 205 (e.g., by controlling the motor 215 and/or the radial traverse 210). Additionally, or alternatively, the processing circuitry 202 and/or the control circuitry 204 may be located outside of the main body 205 (e.g., included in a housing separate from the main body 205).

For example, to mitigate misalignment which may occur during operation of the LWIR camera 200 (e.g., due to movement or flexion of the fan duct 160, the engine casing 165, the main body 205, and/or the probe 220), the LWIR camera 200 is mounted on linear actuators 211 (also referred to herein as linear traverse rails). The processing circuitry 202 supports controlling the movement of the main body 205 (and camera module 201) along with the probe 220, thereby maintaining alignment between the main body 205 (and camera module 201) and the probe 220. For example, the processing circuitry 202 (and control circuitry 204) may support controlling movement of the main body 205 to compensate for any misalignment that may occur, as the physical separation of the main body 205 (and camera module 201) and the probe 220 allows for the main body 205 and probe 220 to move independent of one another. Example aspects of feedback instrumentation utilized in association with maintaining the alignment are later described herein.

The LWIR camera 200 includes a probe 220. In some aspects, the probe 220 is mountable to the engine casing 165 (e.g., to an outer surface of the casing 165). The probe 220 includes one or more sensors 221 configured to detect thermal energy.

According to one or more embodiments of the present disclosure, the main body 205 and the probe 220 may be physically and mechanically separate. The probe 220 is configured to generate and transmit an optical signal 223 based on the detected thermal energy. The optical signal 223 may include data representative of the detected thermal energy. For example, the optical signal 223 may include measurement data associated with the detected thermal energy.

The probe 220 may transmit the optical signal 223 to the main body 205 over an air gap 207 between the probe 220 and the main body 205. In an example, the air gap 207 is less than a distance between the fan duct 160 and the engine casing 165.

The optical design of the LWIR camera 200 and the air gap 207 may accommodate a specific length from an end portion of the probe 220 (e.g., probe exit) to the entrance of the LWIR camera 200. For example, the length may be a distance between the end portion of the probe 220 and the camera entrance of the camera module 201.

In an example, the probe 220 may transmit, and the main body 205 may receive, the optical signal 223 via an aperture 206 of the main body 205. The processing circuitry 202 is configured to provide temperature information in response to processing the optical signal 223.

The LWIR camera 200 includes a shielding structure 225. The shielding structure 225 may preclude stray energy from entering the main body 205 (and camera module 201). The shielding structure 225 may be coupled to the main body 205 and/or the fan duct 160.

In some aspects, the shielding structure 225 may protrude through the fan duct 160 and extend in a direction (e.g., direction D2) perpendicular to the fan duct 160, towards the engine casing 165. According to one or more embodiments of the present disclosure, an inner area of the shielding structure 225 (e.g., defined with respect to a plane D1-D3) at least partially overlaps the aperture 206 of the main body 205.

According to one or more embodiments of the present disclosure, the thermal energy detected by the probe 220 may be associated with a rotor blade 159 (e.g., rotor blade 159-$a$) of the gas turbine engine 120.

In the example configuration of FIG. 2, the probe 220 is mounted to the engine casing 165 and extends across a secondary air cavity between the engine casing 165 and the gaspath casing 170. In an example, the probe 220 at least partially protrudes through the gaspath casing 170 (e.g., in direction D2) and into a stator vane 158 (also referred to herein as an ingress stator vane or an ingress airfoil) of the gas turbine engine 120.

The probe 220 may include a reflective element 222 including a reflective surface. In some aspects, the reflective element 222 may relay light received at the reflective element 222 to the sensor 221. The example configuration is not limited to the positioning of elements described herein, and it is to be understood that the sensor 221 and the reflective element 222 of the probe 220 may be positioned at different locations of the probe 220.

In the example configuration, sensor 221 (e.g., if positioned at the end of the probe 220) and/or reflective element 222 may be at least partially exposed (e.g., in direction D1, toward rotor blade 159-$a$) by an opening formed in the stator vane 158. Accordingly, for example, with reference to FIG. 2, the probe 220 may be capable of detecting thermal energy associated with rotor blade 159-$a$. In the example of FIG. 2, a rotor blade 159-$b$ is adjacent the stator vane 158 but not included in the thermal measurement.

The LWIR camera 200 may further include a gaseous nitrogen (GN2) cooling and purge inlet 230. The purge inlet 230 may be coupled to or integrated with the probe 220. The LWIR camera 200 may further include a camera purge outlet 212 (e.g., capable of purging GN2 or air).

The LWIR camera 200 may be a camera designed to measure infrared electromagnetic radiation practically defined as the 8 μm to 14 μm spectral band. The LWIR camera 200 may include additional components 235. The additional components 235 may include, for example, a series of lens and mirrors including an optical system to focus and direct the infrared electromagnetic radiation. Additionally, or alternatively, the LWIR camera 200 may include an electrical system (not illustrated) to digitize, amplify, and transmit data signals representative of the infrared electromagnetic radiation to a data acquisition system.

According to one or more embodiments of the present disclosure, the probe 220 may be implemented without optical fiber. For example, in one or more embodiments, the probe 220 is absent any optical fiber and may support transmission of signals and light as described herein (e.g., data signals, infrared light, infrared signals, LWIR signals, and the like) without fiber optics. In one or more embodiments, one or more gaps between one or more lenses and/or one or more mirrors of the LWIR camera 200 may be air gaps. In some embodiments, all gaps between one or more lenses and/or one or more mirrors of the LWIR camera 200 may be air gaps. In some cases, use of the air gaps for signal and light transmission as described herein may provide advantages of improved reliability compared to transmission using fiber optics. The probe 220 may be referred to as an optical probe.

According to one or more embodiments of the present disclosure, the LWIR camera 200 includes feedback instrumentation. The feedback instrumentation may be coupled to at least one of the fan duct 160, the engine casing 165, and the probe 220. In some aspects, the feedback instrumentation is configured to provide electrical signals based on movement of at least one of the fan duct 160, the engine casing 165, and the probe 220.

In an example, based on an electrical signal from the feedback instrumentation, the control circuitry 204 may generate control signals associated with maintaining an alignment between the main body 205 and the probe 220 based on the electrical signals. For example, the control circuitry 204 may transmit a control signal to radial traverse 210 and/or motor 215, thereby controlling the main body 205 to maintain alignment with the probe 220. In some examples, the control circuitry 204 may transmit the control signal in association with controlling the main body 205 to maintain the air gap 207 (e.g., maintain a target distance between the main body 205 and the probe 220). In some embodiments, the target distance of the air gap 207 may be in a range of about 6 inches to about 12 inches. However, embodiments of the present disclosure are not limited thereto, and target distance of the air gap 207 may be a distance suitable for signal and light transmission between the probe 220 and the main body 205 (e.g., camera components included in the main body 205).

Additionally, or alternatively, based on an electrical signal from the feedback instrumentation, the control circuitry 204 may generate and provide, to the camera module 201, control signals associated with adjusting parameters (e.g., image capture parameters) of the camera module 201. Non-limiting examples of the feedback instrumentation are later described herein.

In the examples described herein, the stator vane 158 and the rotor blade 159 are associated with low pressure compressor 144 of the gas turbine engine 120. However, embodiments supported by the present disclosure are not limited thereto. For example, aspects of the present disclosure support measuring thermal energy associated with other components of the gas turbine engine 120 (e.g., a rotor blade associated with low pressure turbine 146, high pressure compressor 152, or high pressure turbine 154).

Figure 3:
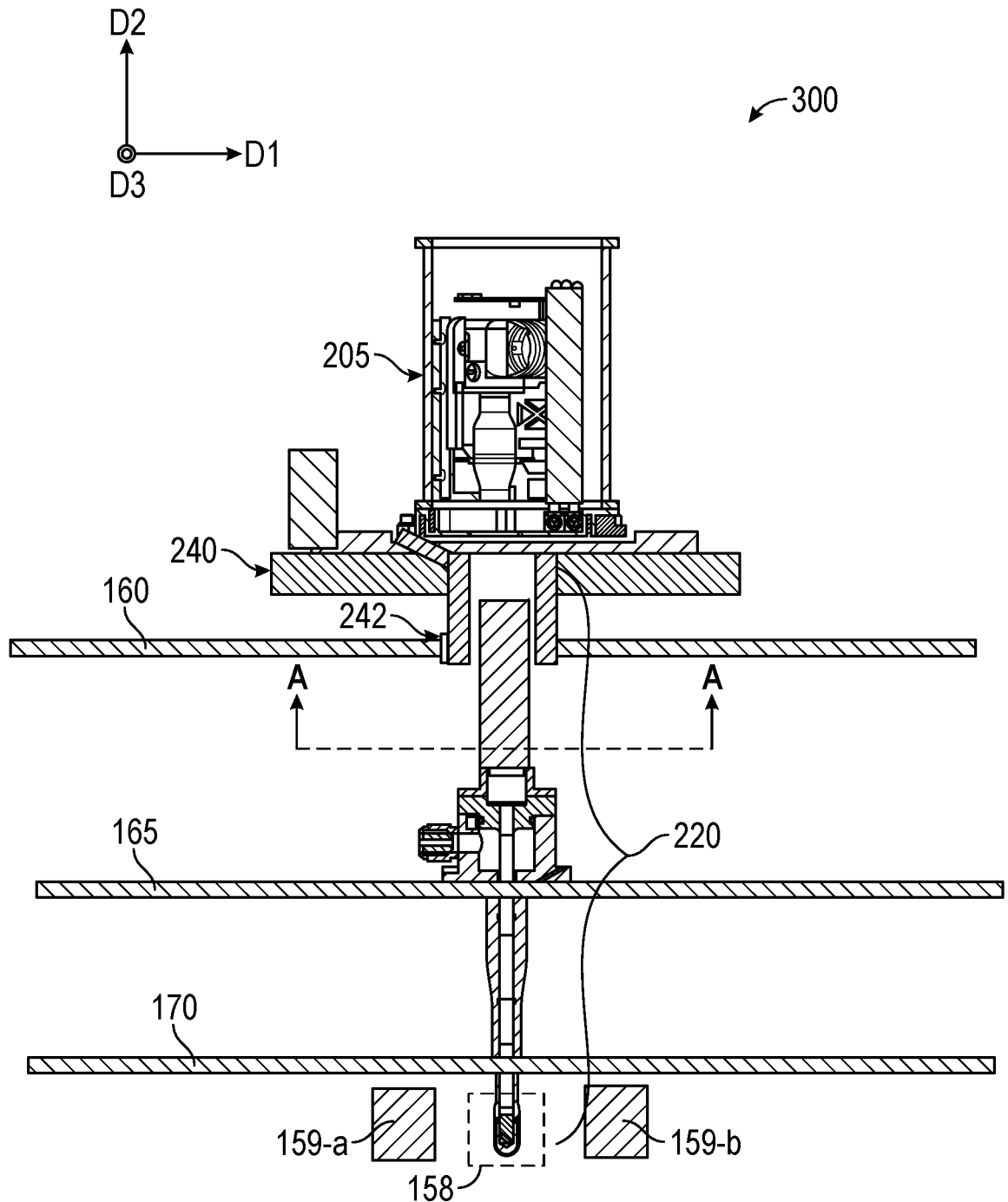
FIG. 3 is a schematic illustrating an example configuration integrating a LWIR camera with a gas turbine engine in accordance with one or more embodiments of the present disclosure.

FIG. 3 is a schematic illustrating an example configuration 300 integrating the LWIR camera 200 with a gas turbine engine 120 in accordance with one or more embodiments of the present disclosure. Repeated descriptions of the LWIR camera 200 and the gas turbine engine 120 are omitted for brevity.

In the example configuration of FIG. 3, the main body 205 is mounted to a mounting structure 240. The mounting structure 240 may be physically separate from the fan duct 160. For example, the mounting structure 240 may be a camera mount support fixed to an object or surface different from the fan duct 160. In an example, the mounting structure 240 may be fixed to the ground, a stationary cart, or the like.

Slider seal 242 includes an annular disc, either metallic or composite, entrapped within a housing. This arrangement provides flow discouragement without limiting translation or rotation of a cylindrical component passing thru the center of the annulus.

Figure 4:
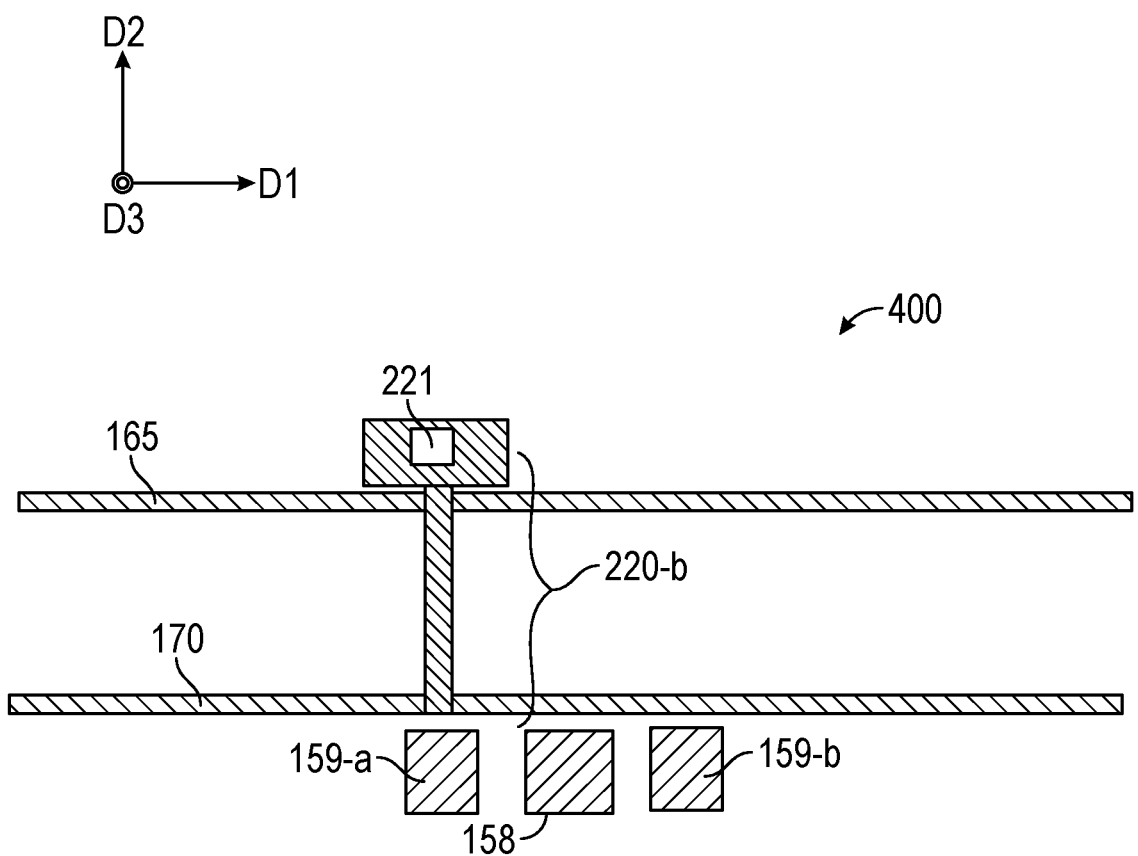
FIG. 4 is a schematic illustrating a configuration utilizing a probe of a LWIR camera in accordance with one or more embodiments of the present disclosure.

FIG. 4 is a schematic illustrating a configuration 400 utilizing a probe 220-b of the LWIR camera 200 in accordance with one or more embodiments of the present disclosure. The probe 220-b includes aspects of the probe 220 described herein (e.g., with reference to FIGS. 2 and 3), and repeated descriptions of like elements are omitted for brevity. Repeated descriptions of the LWIR camera 200 and the gas turbine engine 120 are omitted for brevity.

Referring to FIG. 4, sensor 221 faces in a direction (e.g., direction D2) perpendicular to the gaspath casing 170 and toward the rotor blade 159-a. The probe 220-b protrudes through an opening of the gaspath casing 170, enabling the sensor 221 to detect thermal energy associated with the rotor blade 159-a. As illustrated in the example of FIG. 4, the probe 220-b may be implemented without the reflective element 222 of FIG. 2, as the sensor 221 may face directly toward the rotor blade 159-a. As described with reference to FIG. 4, probe 220-b is a radial viewing probe facing inboard at a target airfoil (e.g., rotor blade 159-a) thru a case mounted objective.

Figure 5:
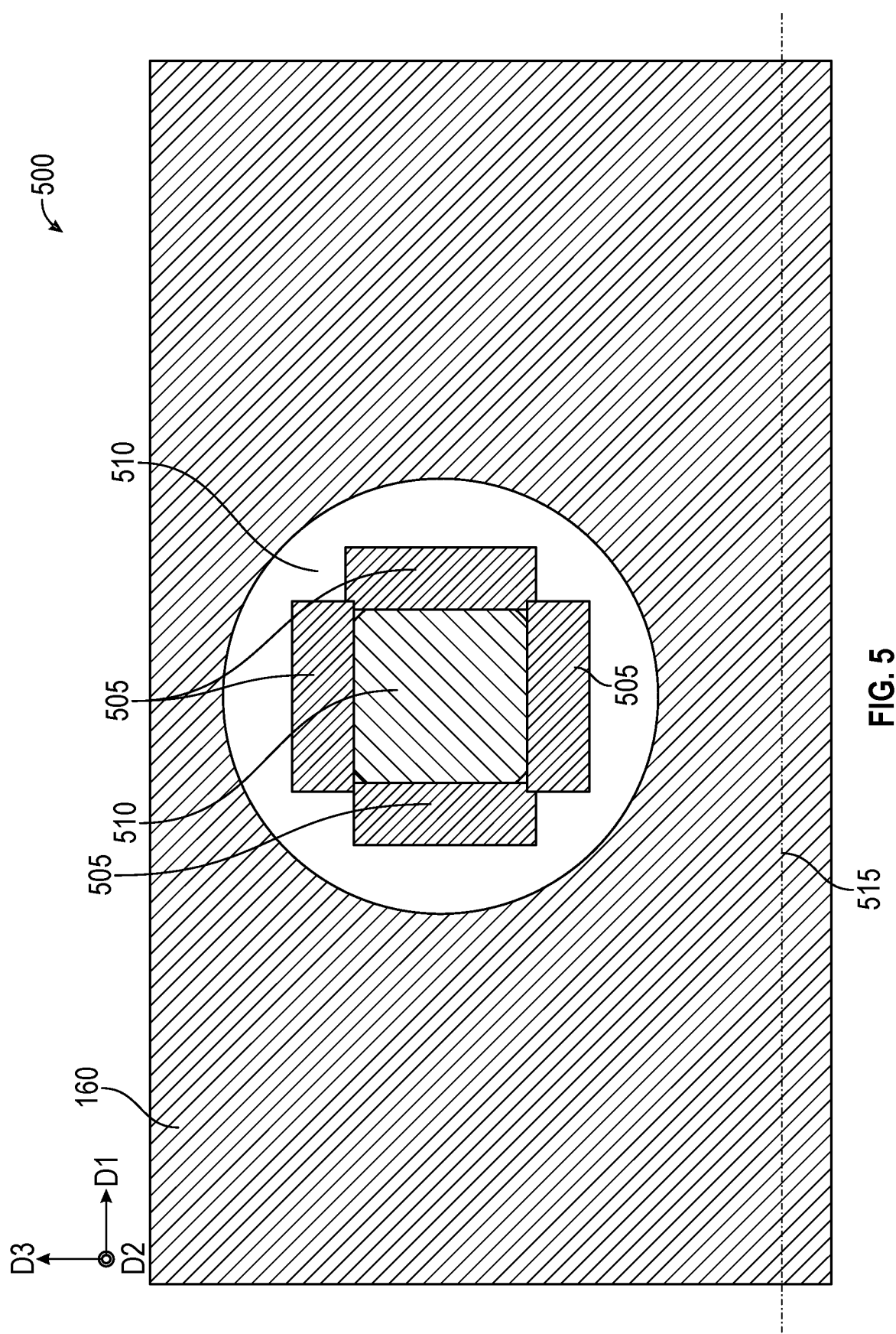
FIG. 5 illustrates a cross-sectional view taken along line A-A of FIG. 1 in accordance with one or more embodiments of the present disclosure.

FIG. 5 illustrates a cross-sectional view 500 taken along line A-A of FIGS. 2, 3, and 6-9. The cross-sectional view 500 is a plan view including the fan duct 160 and a sensing face 501 of the probe 220, positioned with respect to an engine centerline 515 of the gas turbine engine 120. The sensing face 501 may be exposed by an opening 510 formed in the fan duct 160. The sensing face 501 may be located at an end portion of the probe 220.

An example of feedback instrumentation (e.g., photodetectors 505) supportive of maintaining or correcting an alignment between the LWIR camera 200 and the probe 220 in accordance with one or more embodiments of the present disclosure is described herein with reference to FIG. 5.

The photodetectors 505 may be located at an end portion (e.g., at sensing face 501) of the probe 220. The photodetectors 505 may be configured to generate electrical signals in response to detecting emitted light of an infrared band. In an example, the LWIR camera 200 may include an emitter (emission device) integrated with and/or housed in the main body 205, and the emitter may be configured to emit the light of the infrared band. In some examples, the infrared band is a long-wave IR (LWIR) band. For example, the light emitted by the emitter may have a wavelength ranging from 8 μm to 14 μm.

The example aspects of the photodetectors 505 and the emitter are not limited to the example wavelengths and frequency bands described herein. For example, aspects of the present disclosure support implementations using other suitable wavelengths or frequency bands associated with inspecting the gas turbine engine 120.

The photodetectors 505 may provide data indicative of real-time relative movements between the probe 220 (and thereby the engine casing 165) and the main body 205 according to 3 axes (e.g., with respect to the D1, D2, and D3 directions). Based on electrical signals from photodetectors 505 (e.g., as generated in response to energy detected by the photodetectors 505), the processing circuitry 202 and/or control circuitry 204 may generate and provide control signals to radial traverse 210, motor 215, and/or camera module 201 as described herein.

In the example of FIG. 5, the probe 220 (and sensing face 501) includes four photodetectors 505, but aspects of the present disclosure are not limited thereto. For example, the probe 220 may include any suitable quantity and/or configuration of photodetectors 505 for maintaining or correcting an alignment between the LWIR camera 200 and the probe 220.

Figure 6:
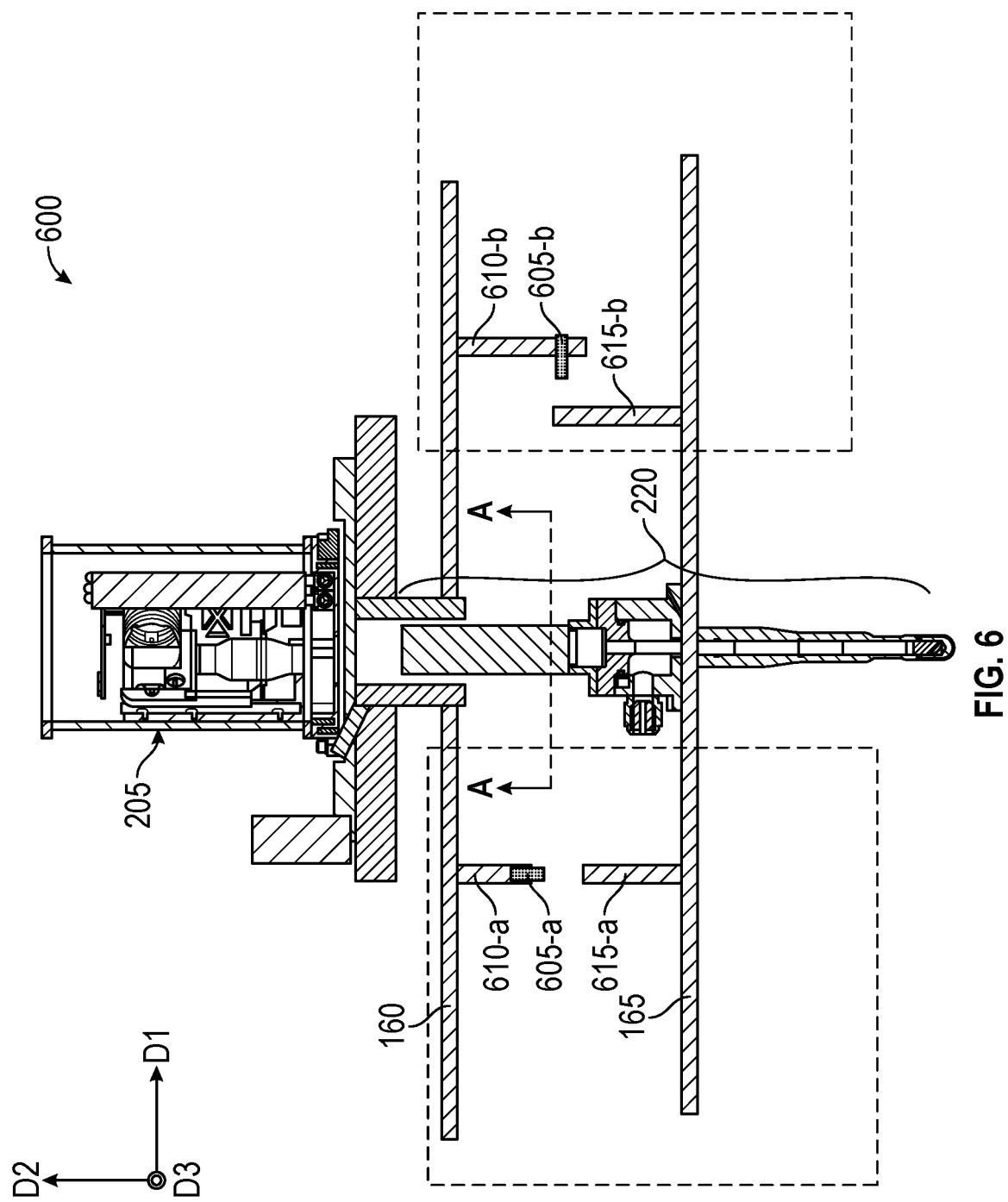
FIG. 6 is a schematic illustrating a configuration utilizing a probe of a LWIR camera in accordance with one or more embodiments of the present disclosure.

FIG. 6 is a schematic illustrating a configuration 600 utilizing probe 220 of the LWIR camera 200 in accordance with one or more embodiments of the present disclosure. Repeated descriptions of the LWIR camera 200 and the gas turbine engine 120 are omitted for brevity. Some identifiers associated with components of the LWIR camera 200 and the gas turbine engine 120 are omitted so as not to obstruct from the discussion of FIG. 6.

An example of feedback instrumentation (e.g., proximity probes 605) supportive of maintaining or correcting an alignment between the LWIR camera 200 and the probe 220 in accordance with one or more embodiments of the present disclosure is described herein with reference to FIG. 6.

The feedback instrumentation includes proximity probes 605 coupled to the fan duct 160. In the example of FIG. 6, proximity probe 605-*a* is coupled to a probe bracket 610-*a*, proximity probe 605-*b* is coupled to a probe bracket 610-*b*, and the probe bracket 610-*a* and probe bracket 610-*b* are coupled to (e.g., rigidly mounted to) the fan duct 160. The feedback instrumentation further includes a target structure 615-*a* and a target structure 615-*b* coupled to (e.g., rigidly mounted to) the engine casing 165. However, aspects of the present disclosure not limited thereto. For example, a probe bracket 610 (and corresponding proximity probe 605) may be coupled to the engine casing 165, and a corresponding target structure 615 may be coupled to the fan duct 160. In another example, both probe brackets 610 (and corresponding proximity probes 605) may be coupled to the engine casing 165, and both target structures 615 may be coupled to the fan duct 160.

The proximity probes 605 may provide data indicative of real-time relative movements between the fan duct 160 and engine casing 165 according to 3 axes (e.g., with respect to the D1, D2, and D3 directions). For example, proximity probe 605-*a* is capable of providing radial measurements. In another example, proximity probe 605-*b* is capable of providing axial measurements. In some aspects, proximity probe 605-*b* may be rotated 90 degrees to provide tangential deflection measurements.

The proximity probes 605 may provide electrical signals indicative of the radial measurements, axial measurements, and/or tangential deflection measurements to the processing circuitry 202 and/or control circuitry 204. Based on the electrical signals from the proximity probes 605, the processing circuitry 202 and/or control circuitry 204 may generate and provide control signals to radial traverse 210, motor 215, and/or camera module 201 as described herein.

Figure 7:
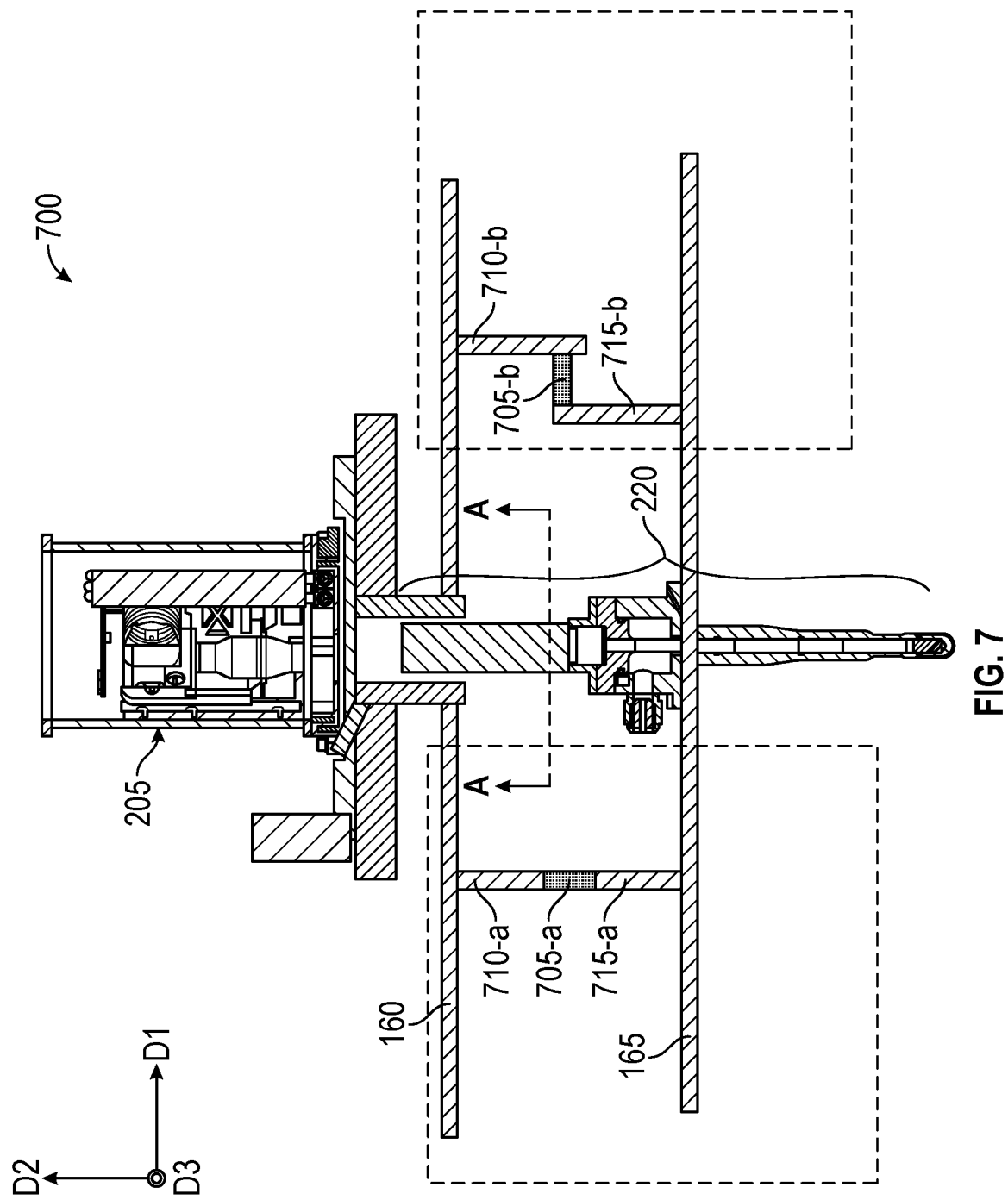
FIG. 7 is a schematic illustrating a configuration utilizing a probe of a LWIR camera in accordance with one or more embodiments of the present disclosure.

FIG. 7 is a schematic illustrating a configuration 700 utilizing probe 220 of the LWIR camera 200 in accordance with one or more embodiments of the present disclosure. Repeated descriptions of the LWIR camera 200 and the gas turbine engine 120 are omitted for brevity. Some identifiers associated with components of the LWIR camera 200 and the gas turbine engine 120 are omitted so as not to obstruct from the discussion of FIG. 7.

An example of feedback instrumentation (e.g., linear variable differential transformers (LVDTs) 705) supportive of maintaining or correcting an alignment between the LWIR camera 200 and the probe 220 in accordance with one or more embodiments of the present disclosure is described herein with reference to FIG. 7. Each LVDT 705 is an electromechanical transducer capable of converting motion of an object (e.g., a duct side mount 710, a case side mount 715) to which the LVDTs 705 is coupled mechanically into a corresponding electrical signal.

For example, the feedback instrumentation includes LVDTs 705 coupled to the fan duct 160 and the engine casing 165. In the example of FIG. 7, LVDT 705-*a* is coupled to a duct side mount 710-*a* and a case side mount 715-*a*, and LVDT 705-*b* is coupled to a duct side mount 710-*b* and a case side mount 715-*b*. The duct side mount 710-*a* and duct side mount 710-*b* are coupled to (e.g., rigidly mounted to) the fan duct 160, and the case side mount 715-*a* and case side mount 715-*b* are coupled to (e.g., rigidly mounted to) the engine casing 165.

The LVDTs 705 may provide data indicative of real-time relative movements between the fan duct 160 and engine casing 165 according to 3 axes (e.g., with respect to the D1, D2, and D3 directions). For example, LVDT 705-*a* is capable of providing radial measurements. In another example, LVDT 705-*b* is capable of providing axial measurements. In some aspects, LVDT 705-*b* may be rotated 90 degrees to provide tangential deflection measurements.

The LVDTs 705 may provide electrical signals indicative of the radial measurements, axial measurements, and/or tangential deflection measurements to the processing circuitry 202 and/or control circuitry 204. Based on the electrical signals from the LVDTs 705, the processing circuitry 202 and/or control circuitry 204 may generate and provide control signals to radial traverse 210, motor 215, and/or camera module 201 as described herein.

Figure 8:
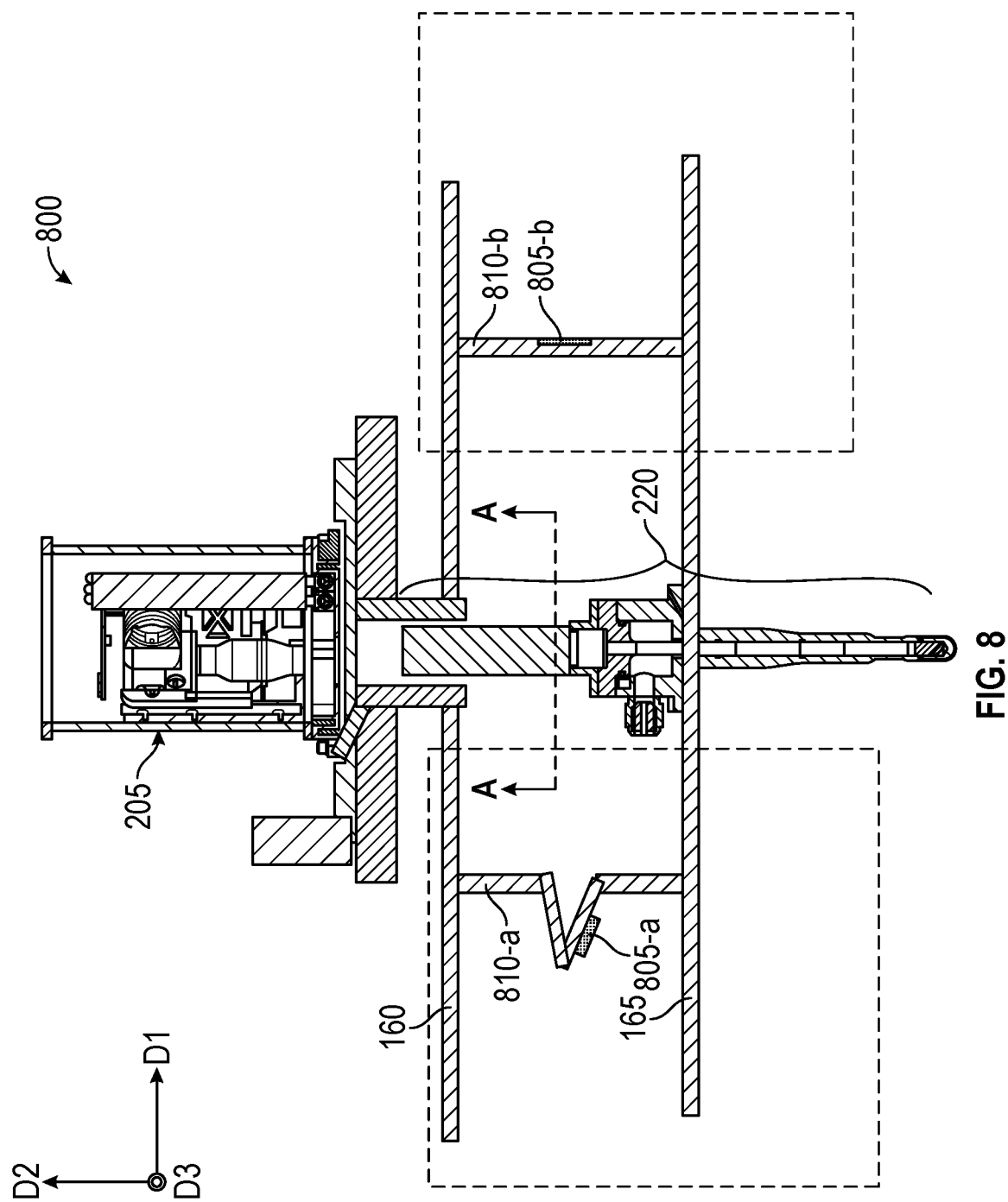
FIG. 8 is a schematic illustrating a configuration utilizing a probe of a LWIR camera in accordance with one or more embodiments of the present disclosure.

FIG. 8 is a schematic illustrating a configuration 800 utilizing probe 220 of the LWIR camera 200 in accordance with one or more embodiments of the present disclosure. Repeated descriptions of the LWIR camera 200 and the gas turbine engine 120 are omitted for brevity. Some identifiers associated with components of the LWIR camera 200 and the gas turbine engine 120 are omitted so as not to obstruct from the discussion of FIG. 8.

An example of feedback instrumentation (e.g., strain gages 805) supportive of maintaining or correcting an alignment between the LWIR camera 200 and the probe 220 in accordance with one or more embodiments of the present disclosure is described herein with reference to FIG. 8. Each strain gage 805 is a sensor having a resistance which varies with applied force. For example, each strain gage 805 is coupled to an elastic member 810 and converts force, pressure, tension, or the like associated with the elastic member 810 into a change in electrical resistance.

For example, the feedback instrumentation includes elastic member 810-*a* and elastic member 810-*b* each coupled to (e.g., rigidly mounted to) the fan duct 160 and the engine casing 165. In the example of FIG. 8, strain gage 805-*a* is coupled to elastic member 810-*a*, and strain gage 805-*b* is coupled to elastic member 810-*b*.

The strain gages 805 may provide data indicative of real-time relative movements between the fan duct 160 and engine casing 165 according to 3 axes (e.g., with respect to the D1, D2, and D3 directions). For example, strain gage 805-*a* is capable of providing electrical resistance measurements (or changes in electrical resistance) that correspond to radial movement/measurements. In another example, strain gage 805-*b* is capable of providing electrical resistance measurements (or changes in electrical resistance) that correspond to axial movement/measurements. In some aspects, strain gage 805-*b* may be rotated 90 degrees to provide tangential deflection movement/measurements.

The strain gages 805 may provide electrical signals indicative of the electrical resistance measurements (which correspond to radial, axial, and/or tangential deflection movement/measurements) to the processing circuitry 202 and/or control circuitry 204. Based on the electrical signals from the strain gages 805, the processing circuitry 202 and/or control circuitry 204 may generate and provide control signals to radial traverse 210, motor 215, and/or camera module 201 as described herein.

Figure 9:
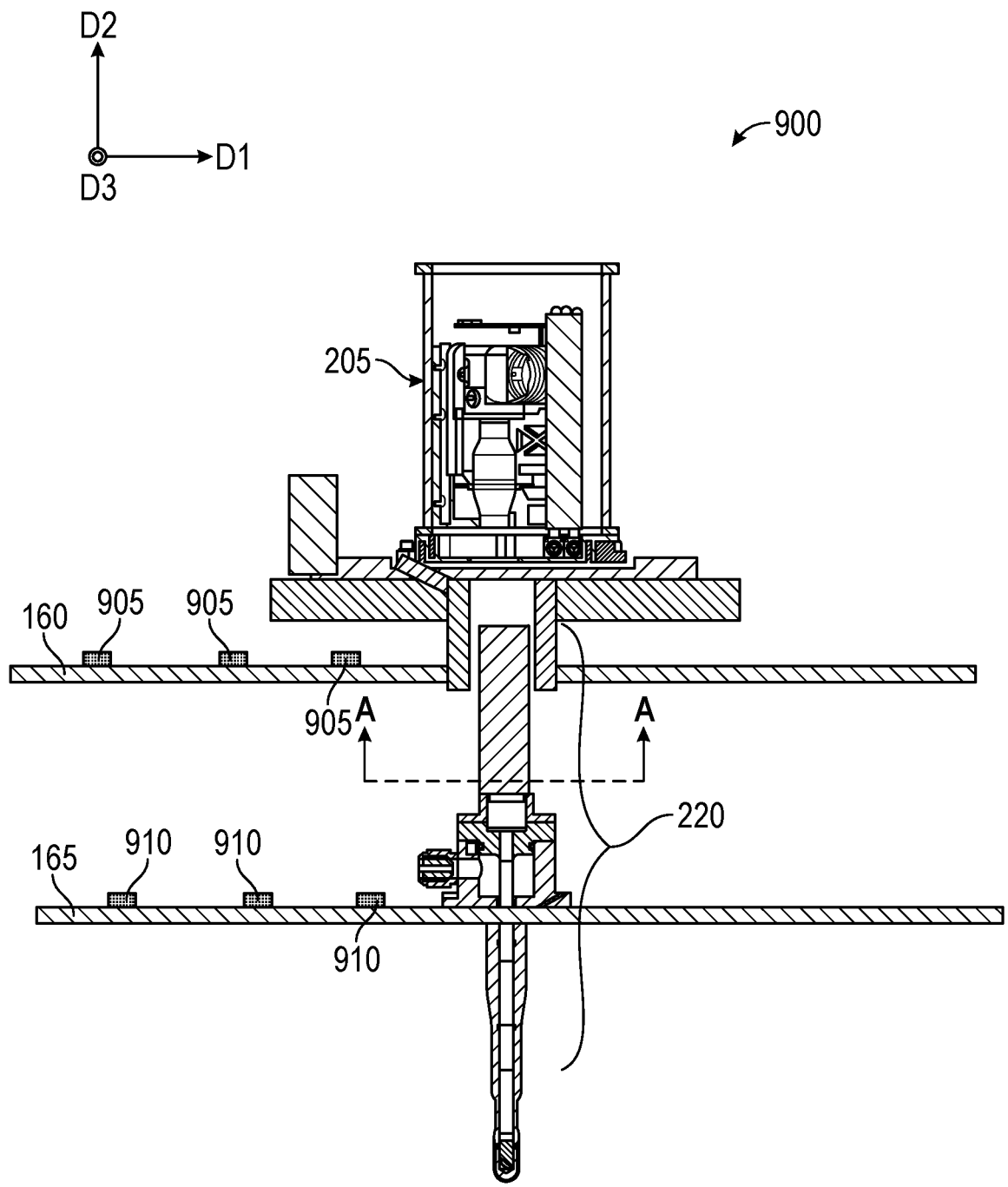
FIG. 9 is a schematic illustrating a configuration utilizing a probe of a LWIR camera in accordance with one or more embodiments of the present disclosure.

FIG. 9 is a schematic illustrating a configuration 900 utilizing probe 220 of the LWIR camera 200 in accordance with one or more embodiments of the present disclosure. Repeated descriptions of the LWIR camera 200 and the gas turbine engine 120 are omitted for brevity. Some identifiers associated with components of the LWIR camera 200 and the gas turbine engine 120 are omitted so as not to obstruct from the discussion of FIG. 9.

An example of feedback instrumentation (e.g., thermocouple 905, thermocouple 910) supportive of maintaining or correcting an alignment between the LWIR camera 200 and the probe 220 in accordance with one or more embodiments of the present disclosure is described herein with reference to FIG. 9. The thermocouples (e.g., thermocouple 905, thermocouple 910) described herein may be metal thermocouples which may be used to provide real-time relative movements between the fan duct 160 and engine casing 165 in the axial direction.

Each thermocouple 905 is capable of determining temperature at a location on the fan duct 160 to which the thermocouple 905 is coupled, and each thermocouple 910 is capable of determining temperature at a location on the engine casing 165 to which the thermocouple 910 is coupled. In the example of FIG. 9, the feedback instrumentation includes a series of thermocouples 905 along the fan duct 160 and a series of thermocouples 910 along the engine casing 165.

The thermocouples 905 and thermocouples 910 may provide electrical signals indicative of the determined temperatures to the processing circuitry 202 and/or control circuitry 204. Based on the electrical signals from the thermocouples 905 and thermocouples 910, the processing circuitry 202 and/or control circuitry 204 may determine average temperatures of the fan duct 160 and/or the engine casing 165, thermal growth associated with the fan duct 160 and/or the engine casing 165, and accordingly, relative deflection of the fan duct 160 and/or the engine casing 165. Based on the relative deflection, the processing circuitry 202 and/or control circuitry 204 may determine relative position of the probe 220 to the main body 205, and accordingly, generate and provide control signals to radial traverse 210, motor 215, and/or camera module 201 as described herein.

Figure 10:
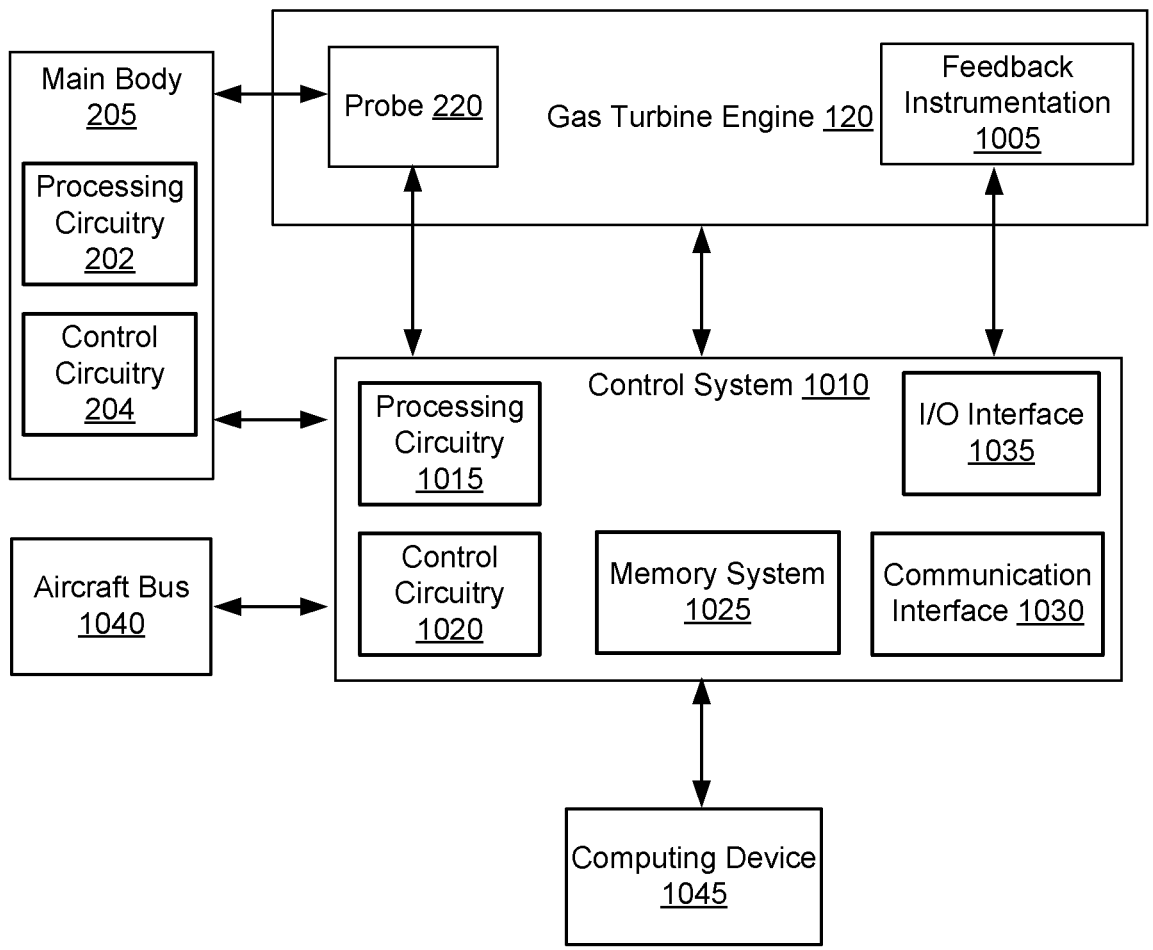
FIG. 10 depicts an example of a control system in accordance with one or more embodiments of the present disclosure.

FIG. 10 depicts an example of a control system 1000 in accordance with one or more embodiments of the present disclosure. The control system 1000 is configured to monitor and control operation of a gas turbine engine (e.g., the gas turbine engine 120) and/or the LWIR camera 200 in real-time (or near-real time) according to one or more embodiments described herein.

In some embodiments, the control system 1000 performs the functionality of a data acquisition system by receiving, processing, storing and/or reporting data received from feedback instrumentation 1005 (e.g., photodetectors 505, proximity probes 605, LVDTs 705, strain gages 805, thermocouples 905, and the like described herein). The control system 1000 can control functions of the gas turbine engine 120 and/or the LWIR camera 200 by generating one or more commands.

The control system 1000 (also referred to as a "controller") can be a full authority digital engine control (FADEC) that includes processing circuitry 1015 (also referred to as a "processing device"), control circuitry 1020, and a memory system 1025 (also referred to as a "memory") configured to store a plurality of configuration items, where at least one of the configuration items includes a sequence of the computer executable instructions for execution by the processing circuitry 1015. Other types of configuration items can include data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 120. The processing circuitry 1015 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 1025 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The control system 1000 can also include one or more of an input/output interface 1035, a communication interface 1030, and/or other elements. The input/output interface 1035 can include support circuitry for interfacing with the LWIR camera 200 (e.g., camera module 201, processing circuitry 202, control circuitry 204, probe 220) and feedback instrumentation 1005, such as filters, amplifiers, digital-to-analog converters, analog-to-digital converters, and other such circuits to support digital and/or analog interfaces. Further, the input/output interface 1035 can receive or output signals to/from other sources, such as discrete inputs/outputs and/or status signals.

The communication interface 1030 may communicate with an aircraft bus 1040 of an aircraft. The aircraft bus 1040 can provide aircraft-level parameters and commands that are used by the control system 1000 to control the gas turbine engine 120 in real-time. The communication interface 1030 may also support communication with other components, such as other instances of the control system 1000, storage units, diagnostic units, communication adapters, off-board systems, and the like. For example, the communication interface 1030 may support communication with a computing device 1045 (e.g., an aircraft testing computer, an aircraft maintenance computer, or the like) to provide for communication between (e.g., transmitting commands/data to and/or receiving commands/data from) the control system 1000 and the computing device 1045.

The control system 1000 provides for, among other things, monitoring the gas turbine engine 120 based on data collected by the LWIR camera 200 (e.g., camera module 201, probe 220) and feedback instrumentation 1005. The gas turbine engine 120 is one example of an aircraft engine, and other examples are also possible, such as hybrid electric turbine engines. It may be desirable to monitor properties of the gas turbine engine 120, such as temperature, pressure, flow rate, etc. to detect problems, such as anomalies, with the gas turbine engine 120.

Figure 11:
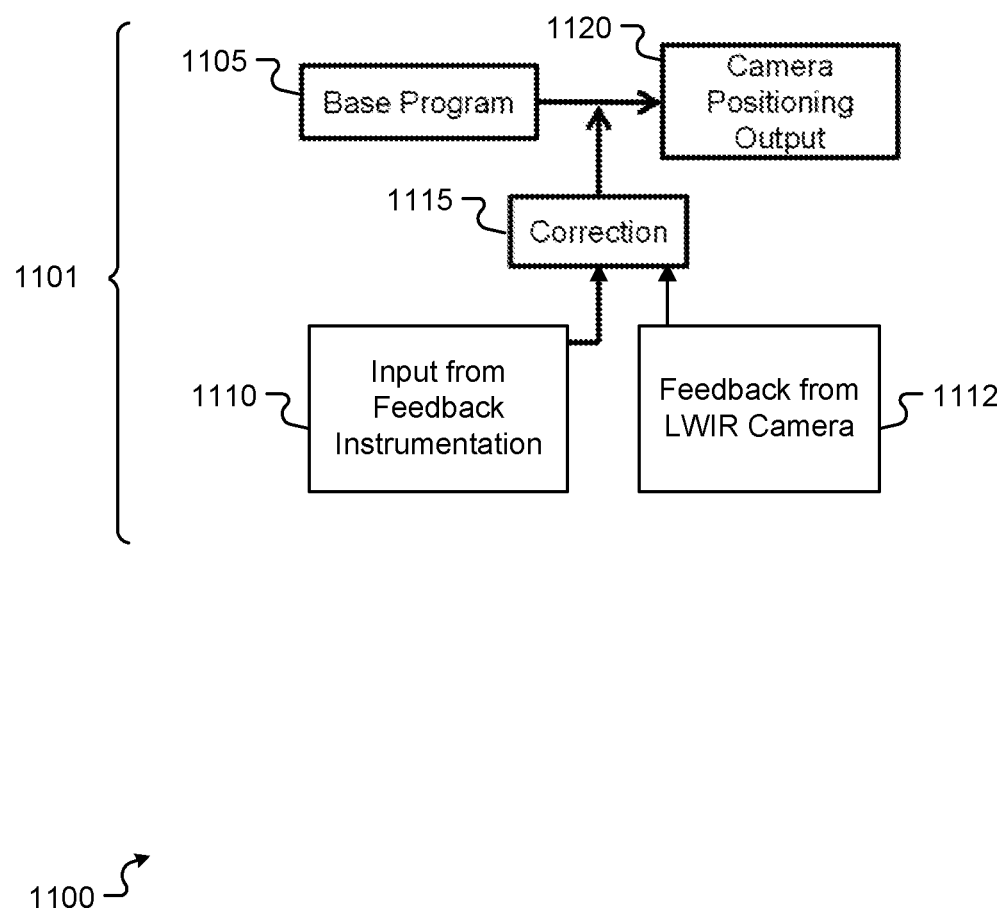
FIG. 11 is a block diagram supportive of a camera positioning program in association with obtaining thermal measurements, in accordance with one or more embodiments of the present disclosure.

FIG. 11 is a block diagram 1100 supportive of a camera positioning program 1101 (e.g., maintaining or correcting alignment between a LWIR camera 200 and a probe 220) in association with obtaining thermal measurements, in accordance with one or more embodiments of the present disclosure. Aspects the features described with reference to block diagram 1100 may be implemented by the example aspects of control system 1000 as described herein.

Base program 1105 includes configurations supportive of a defined analytical use case (e.g., expected case and expected duct excursions).

The camera positioning program 1101 includes a feedback loop incorporating input data 1110 from feedback instrumentation (e.g., photodetectors 505, proximity probes 605, LVDTs 705, strain gages 805, thermocouples 905) described herein. Based on the data from the feedback instrumentation, the camera positioning program 1101 provides correction (at 1115) to the base program 1105. For example, The correction to the base program may address uncertainty or errors in the analytical predictions. In an example, if the fan ducting excursion lags the engine casing excursion by more than predicted, the signal exiting the probe 220 may become misaligned with the camera objective, which may result in a potential loss of signal/measurement/data collection. Through the use of one or more of the feedback instrumentation systems described herein, the camera positioning program 1101 may provide real-time correction for the misalignment and mitigate the aforementioned shortfall. In one or more embodiments, the camera positioning program 1101 may define distance 'x' over time period 't' and a correction factor 'f', in which the correction factor 'f' is added to 'x' over the same time period 't'. Accordingly, for example, the camera positioning program 1101 may provide a driving function of (x+f)/t=position of the LWIR camera 200.

In one or more embodiments, the camera positioning program 1101 may alternatively and/or additionally incorporate feedback 1112 from the LWIR camera 200 for positional correction. For example, the feedback 1112 may include data indicating whether an image is out of focus and/or data indicating positioning adjustments for adjusting the focus, and the camera positioning program 1101 may provide correction (at 1115) to the base program 1105 based on the feedback 1112. The camera positioning program 1101 may provide a camera positioning output 1120 (e.g., positioning commands for the LWIR camera 200) based on the base program 1105 and the correction as provided at 1115.

Aspects of the present disclosure support utilizing feedback from feedback instrumentation other than that described herein. Other non-limiting examples of feedback instrumentation include capacitance probes, Eddy current probes, or the like. In one or more embodiments, the camera positioning program 1101 may incorporate feedback from one or more sources (e.g., photodetectors 505, proximity probes 605, and the like described herein) based on which to provide correction associated with the base program 1105 and/or camera positioning.

Figure 12:
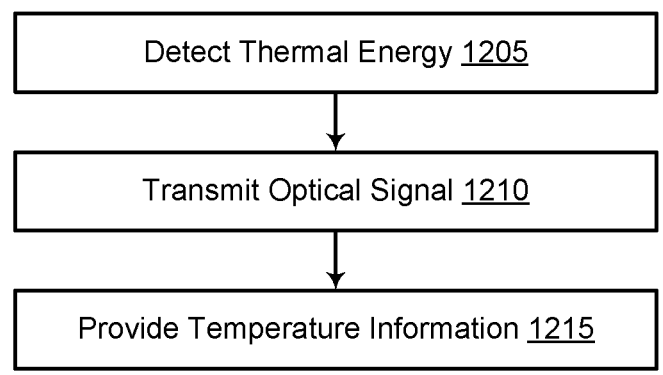
FIG. 12 illustrates an example flowchart in accordance with one or more embodiments of the present disclosure.

FIG. 12 illustrates an example flowchart of a method 1200 of controlling a thermal imaging device (e.g., LWIR camera 200) for a gas turbine engine in accordance with one or more embodiments of the present disclosure. The method 1200 may be implemented by the example aspects of a LWIR camera 200 and/or a control system 1010 as described herein.

At 1205, the method includes detecting, by a probe of a thermal imaging device, thermal energy associated with a gas turbine engine.

At 1210, the method includes transmitting, by the probe, an optical signal based on detected thermal energy associated with the gas turbine engine, wherein the optical signal is transmitted to an aperture of a main body of the thermal imaging device, over an air gap between the probe and the main body.

At 1215, the method includes providing temperature information associated with the gas turbine engine in response to processing the optical signal.

In addition to one or more of the features described herein, or as an alternative to any of the embodiments, the method includes generating, by control circuitry, one or more control signals associated with maintaining the air gap between an end portion of the probe and the main body.

In addition to one or more of the features described herein, or as an alternative to any of the embodiments, a target distance of the air gap is in a range of about 6 inches to about 12 inches.

In addition to one or more of the features described herein, or as an alternative to any of the embodiments, the method includes generating, by control circuitry, one or more control signals associated with maintaining an alignment between the probe and the main body.

In addition to one or more of the features described herein, or as an alternative to any of the embodiments, the method includes emitting, by an emitter integrated with the main body, light of an infrared (IR) band; generating, by a set of photodetectors located at an end portion of the probe, an electrical signal in response to detecting the emitted light; and generating, by control circuitry, one or more control signals associated with positioning the main body based on the electrical signal.

In addition to one or more of the features described herein, or as an alternative to any of the embodiments, the IR band is a long-wave IR band.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
a fan duct;
an engine casing; and
a gaspath casing,
wherein a thermal imaging device is integrated with the gas turbine engine, the thermal imaging device comprising:
a main body comprising processing circuitry, wherein the main body is mountable to the fan duct or a mounting structure separate from the fan duct;
a probe mounted to the engine casing, wherein:
the probe comprises one or more sensors configured to detect thermal energy; and
the probe is configured to transmit an optical signal based on the detected thermal energy, to an aperture of the main body, over an air gap between the probe and the main body,
wherein the processing circuitry is configured to provide temperature information in response to processing the optical signal; and
control circuitry configured to generate one or more control signals associated with maintaining the air gap between an end portion of the probe and the main body.

2. The gas turbine engine of claim 1, wherein a target distance of the air gap is in a range of about 6 inches to about 12 inches.

3. The gas turbine engine of claim 1, wherein the one or more control signals are further associated with maintaining an alignment between the probe and the main body.

4. The gas turbine engine of claim 1, wherein the thermal imaging device further comprises feedback instrumentation, wherein the feedback instrumentation comprises:
an emitter integrated with the main body and configured to emit light of an infrared (IR) band; and
a set of photodetectors located at an end portion of the probe and configured to generate an electrical signal in response to detecting the emitted light;
wherein the control circuitry is configured to generate the one or more control signals based on the electrical signal, and the one or more control signals are further associated with positioning the main body.

5. The gas turbine engine of claim 4, wherein the IR band is a long-wave IR band.

6. The gas turbine engine of claim 1, wherein:
the probe at least partially protrudes through and is mounted to the gaspath casing; and
the one or more sensors face in a direction toward a rotor blade of the gas turbine engine.

7. The gas turbine engine of claim 1, wherein the main body is located outside of the gas turbine engine.

8. The gas turbine engine of claim 1, wherein:
the thermal imaging device further comprises a shielding structure coupled to the main body, to the fan duct, or both.

9. The gas turbine engine of claim 1, wherein:
the thermal imaging device further comprises a motor configured to position the main body based on the one or more control signals generated by the control circuitry of the thermal imaging device.

10. The gas turbine engine of claim 1, wherein:
the gas turbine engine further comprises a low pressure compressor, a low pressure turbine, a high pressure compressor, and a high pressure turbine; and
the thermal energy is associated with at least one of the low pressure compressor, the low pressure turbine, the high pressure compressor, and the high pressure turbine.

11. The gas turbine engine of claim 1, wherein the gas turbine engine is a prototype gas turbine engine.

12. A method of controlling a thermal imaging device for a gas turbine engine, comprising:
detecting, by a probe of the thermal imaging device, thermal energy associated with the gas turbine engine;
transmitting, by the probe, an optical signal based on detected thermal energy associated with the gas turbine engine, wherein the optical signal is transmitted to an aperture of a main body of the thermal imaging device, over an air gap between the probe and the main body;
providing temperature information associated with the gas turbine engine in response to processing the optical signal; and
generating, by control circuitry, one or more control signals associated with maintaining the air gap between an end portion of the probe and the main body.

13. The method of claim 12, wherein a target distance of the air gap is in a range of about 6 inches to about 12 inches.

14. The method of claim 12,
wherein the one or more control signals are further associated with maintaining an alignment between the probe and the main body.

15. The method of claim 12, further comprising:
emitting, by an emitter integrated with the main body, light of an infrared (IR) band;
generating, by a set of photodetectors located at an end portion of the probe, an electrical signal in response to detecting the emitted light; and
generating, by the control circuitry, the one or more control signals based on the electrical signal, wherein the one or more control signals are further associated with positioning the main body.

16. The method of claim 15, wherein the IR band is a long-wave IR band.

* * * * *